Figures 1, 2:
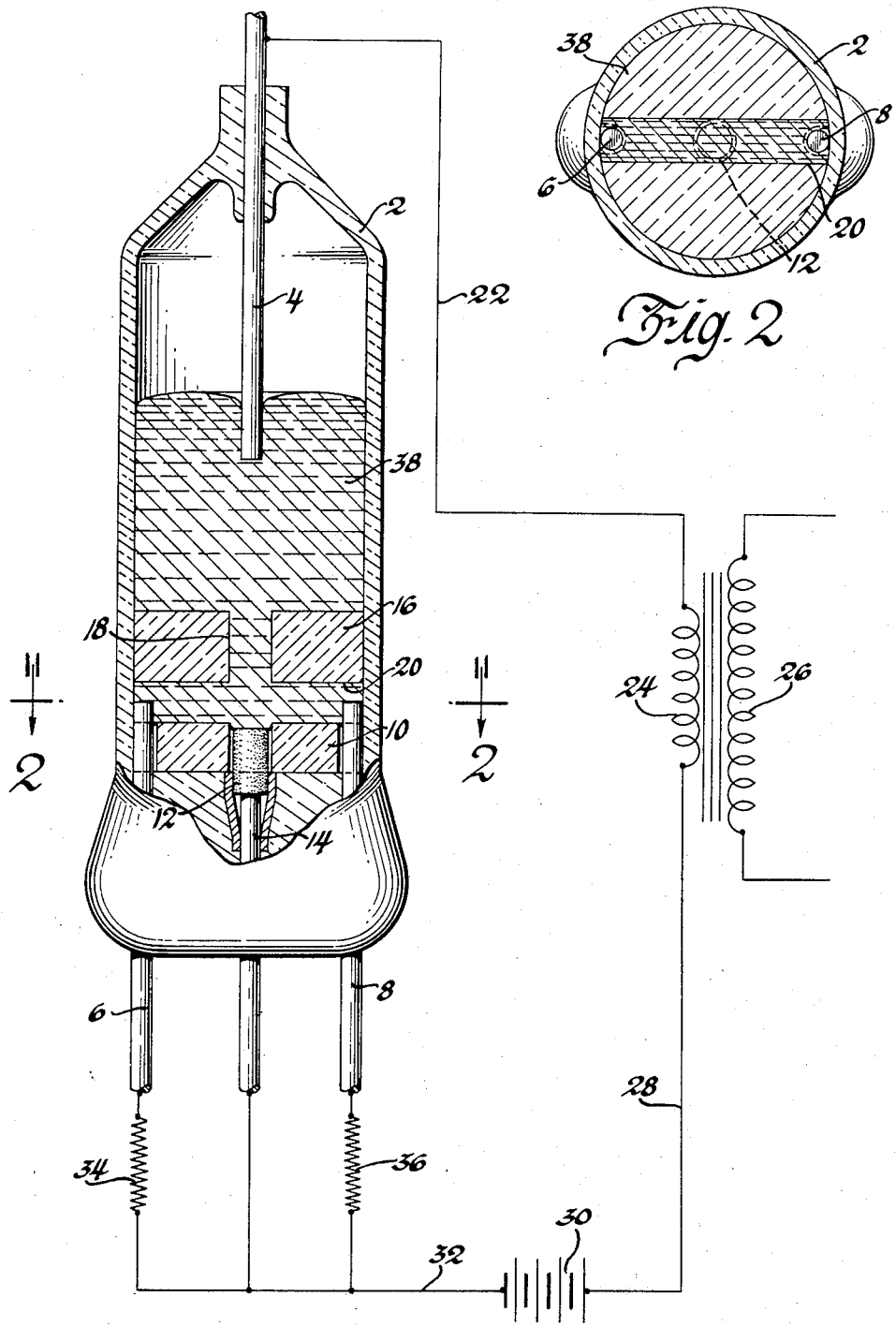

July 14, 1942.  W. S. BRIAN  2,289,622
INTERRUPTER
Filed Nov. 3, 1941

Inventor
William S. Brian
By Blackmore, Spencer & Flint
Attorneys

Patented July 14, 1942

2,289,622

UNITED STATES PATENT OFFICE 2,289,622

INTERRUPTER

William S. Brian, Owensboro, Ky., assignor to General Motors Corporation, Detroit, Mich., a corporation of Delaware Application November 3, 1941, Serial No. 417,623

6 Claims. (Cl. 200—113)

This invention relates to circuit interrupter means and more specifically to the type of interrupter in which a column of mercury is used as a portion of the circuit and sufficient current is passed therethrough to cause vaporization of the same to automatically break said circuit and cause said desired interruption.

The type of interrupter disclosed in this application is that in which a body of mercury is used as a portion of the conductive circuit. This body is in contact with an electrode having a higher electrical resistance than mercury and as an illustration in this instance is formed of carbon which when sufficient current is passed through the electrode to the mercury, causes heat to be generated at the juncture and vaporization of the mercury which immediately recondenses and reforms the circuit, causing periodic interruption thereof as long as sufficient current is applied thereto. However, in the usual form of these interrupters the circuit is broken and some arcing obtained at the juncture between the carbon electrode and the mercury.

This type of interrupter is therefore primarily a thermal device and the current therethrough will be determined by the total heat supplied to the interrupter in the region of the carbon point, mercury contact. If the arcing at this point is intense, then this supplies heat to the mercury and not much heat is required from current flow to cause mercury vaporization each cycle. This, therefore, keeps the current to a low value in the whole circuit and limits the load that can be supplied by the interrupter circuit. If a circuit is provided that is not thermal through which the current may pass, but said circuit may be broken by the thermal interrupter, then higher currents may be obtained through this auxiliary path and the total current and energy output may be increased as desired.

It is an object of my invention to provide an auxiliary circuit in an autonomic interrupter which is broken by the interrupter operation allowing a heavier current load.

It is a further object of my invention to provide means whereby the circuit through a periodic interrupter may be finally broken at an auxiliary point removed from the main interrupter electrodes.

It is a still further object of my invention to provide an auxiliary electrode which maintains a connection with a second main electrode long enough to substantially decrease arcing between the carbon electrode and the mercury just prior to breaking of the total circuit and permit heavier circuit loads.

With these and other objects in view, the embodiments of my invention will be best understood by reference to the following specification and claims and the illustrations in the accompanying drawing, in which:

Figure 1 is a vertical section through an interrupter incorporating my invention; and Figure 2 is a sectional view taken on line 2—2 of Figure 1.

Referring now more specifically to the drawing, there is illustrated a substantially cylindrical casing 2 formed of insulating material in one end of which is supported an electrode 4. In the opposite end of the casing and adjacent the periphery thereof are supported a pair of similar metal electrodes 6 and 8 which are sealed into the end of the casing as shown herein, but which may be supported in any other suitable way. Across the base of the casing there is mounted a block of insulating material 10 through which these two electrodes pass and which supports at its center an electrode 12 of material having a higher electrical resistance than mercury and for purposes of illustration herein I utilize carbon. This carbon electrode has staked into its lower end a connector 14 and has its upper surface set slightly below the upper surface of the block 10. There is also provided a substantial body of mercury 38 to extend between this group of electrodes in the base of the casing and the previously mentioned electrode 4 which extends downwardly from the top thereof.

Mounted above the block 10 and extending entirely across the casing 2 is a spacing member 16 which has a vertical channel 18 therein and also a transverse channel 20 which intersects at right angles. This block is secured to the sides of the casing and provides a transverse channel for the mercury between the three electrodes 6, 12 and 8 and the vertical channel 18 provides a space through which the mercury may erupt when it vaporizes to break the circuit between electrode 4 and any of the other lower electrodes.

Electrode 4 is connected by line 22 to the primary 24 of a transformer, the secondary 26 of which is connected by a suitable line to any desired load. The opposite side of the primary 24 is connected by line 28 to one terminal of the battery 30, the opposite terminal of which is connected by line 32 to line 14 and electrodes 6 and 8, the latter two having a resistor 34 and 36 respectively connected between the battery and the electrode.

The operation of the device is as follows:

When the circuit is completed as shown in Figure 1, current will pass from one pole of the battery through line 32, line 14, electrode 12, through the mercury 38 to the electrode 4, line 22, transformer primary 24, line 28 and back to battery 30. Current will therefore flow until the mercury adjacent the central electrode 12 is heated and vaporizes sufficiently to cause the mercury to erupt through the central opening 18 of the spacer.

However, it will be noted that the mercury first flashing off of the upper surface of electrode 12 will not entirely disconnect the flow of current from the electrode 4 to the line 32 since it still has two paths through the mercury and the electrodes 6 and 8 and their associated resistors and therefore the circuit will not be entirely broken until the vapor has caused the mercury to pass up within the restriction 18 of the spacer at which time the primary circuit will be entirely broken. This final breaking of the primary circuit will therefore occur when the mercury passes up into this restriction and the arcing for a given current load will be less than with the ordinary type of interrupter tube.

The mercury vapor which causes the circuit through the interrupter to be broken is formed of course from heat applied to the mercury. This may come from the passage of electrical current therethrough, or from arcs drawn by the breaking circuit. Therefore, by cutting down the arcing through by-passing some of the current and causing final circuit severance at a point removed from the carbon electrode, a heavier current load can be handled by a given interrupter with more efficient operation.

I claim:

1. In an interrupter, a casing, an electrode at one end thereof, a plurality of electrodes at the opposite end, a body of mercury in the casing joining the electrodes, spacing means adjacent the plurality of electrodes having intersecting channels therein whereby different mercury threads contact the different electrodes and the circuits between the electrodes and the mercury are broken at different times upon an application of current sufficient to cause vaporization of the mercury.

2. In an interrupter, a casing, an electrode supported at one end thereof, a plurality of electrodes supported in spaced relation at the opposite end, a body of mercury interconnecting the electrodes, and a spacing element in the casing between the two ends having channels therein to divide the mercury into a plurality of paths and cause the circuits therethrough to be broken at certain electrodes before others when a potential difference is applied thereto.

3. In an autonomic interrupter having a pair of spaced electrodes in a casing interconnected by a body of mercury, an auxiliary electrode in juxtaposition to but spaced from one of the electrodes, spacing means in the casing adjacent the two electrodes having intersecting channels therein to separate the mercury into a plurality of intersecting threads which connect the electrodes whereby the circuit between one main electrode and the other will be broken before the circuit between one main electrode and the auxiliary electrode when sufficient current to vaporize the mercury is applied.

4. In an interrupter, a casing, an electrode mounted in one end of the casing, a body of mercury within the casing, a second electrode mounted at the opposite end of the casing, said second electrode having higher resistance to the flow of current than mercury, an auxiliary electrode mounted in spaced relation and juxtaposition to the second electrode and spacing means between the two first mentioned electrodes having intersecting channels therein into which the mercury may flow to contact all electrodes, whereby when sufficient current is passed through the mercury between the first two electrodes to cause vaporization of the same, the circuit will be broken finally between the auxiliary electrode and the first named electrode.

5. In an interrupter, an insulating casing, a plurality of electrodes mounted in spaced relation in one end of the casing, at least one of which is formed of a material of substantial electrical resistance, a further electrode mounted in the opposite end of the casing, a body of mercury within the casing joining the various electrodes and spacing means between the electrodes in one end of the casing and the last mentioned electrode having a plurality of intersecting channels therein to divide the mercury into intersecting threads whereby when current is passed through the mercury in sufficient quantity to cause the same to vaporize, the circuit between the mercury and the resistance electrode will be broken prior to that between the remaining electrodes on that end of the casing and the last mentioned electrode.

6. In an interrupter, an insulating casing, an electrode supported in one end of said casing, a carbon electrode supported in the opposite end of the casing, a body of mercury extending between the two electrodes within the casing, a pair of auxiliary electrodes mounted adjacent the carbon electrode and adapted to be connected to the same source of potential and a spacing member formed of insulating material mounted within the casing above the carbon electrode having a transverse and a longitudinal channel therein whereby the mercury in the transverse channel will connect the three electrodes at one end together electrically and the mercury in the longitudinal channel provides an electrical connection to the first named electrode from any of the three electrodes.

WILLIAM S. BRIAN.